Figure 6:
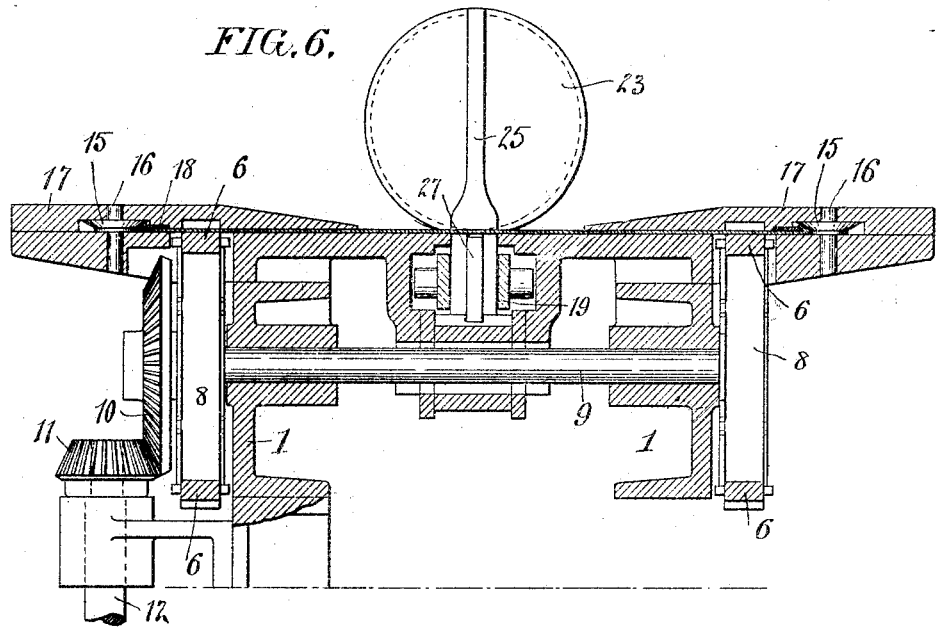

J. C. DONNELLY.
MACHINE FOR MAKING CAN BODIES.
APPLICATION FILED JULY 11, 1905.
919,557.
Patented Apr. 27, 1909.
13 SHEETS—SHEET 1.
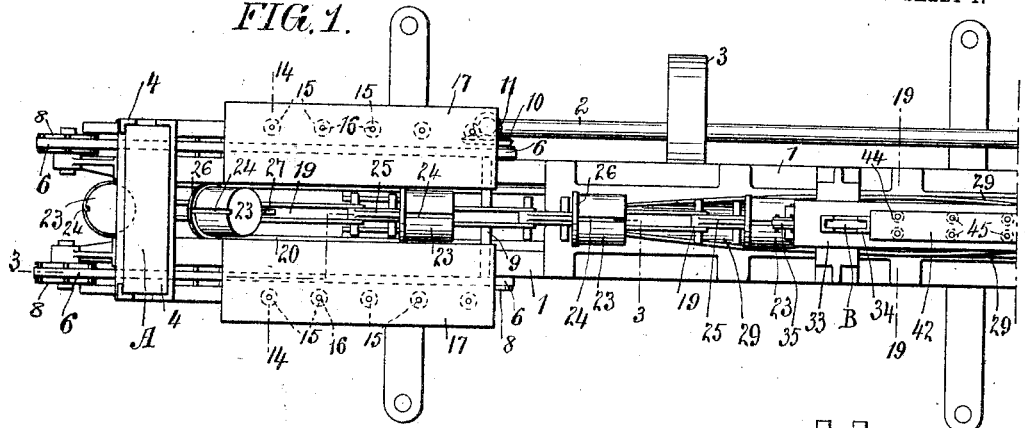
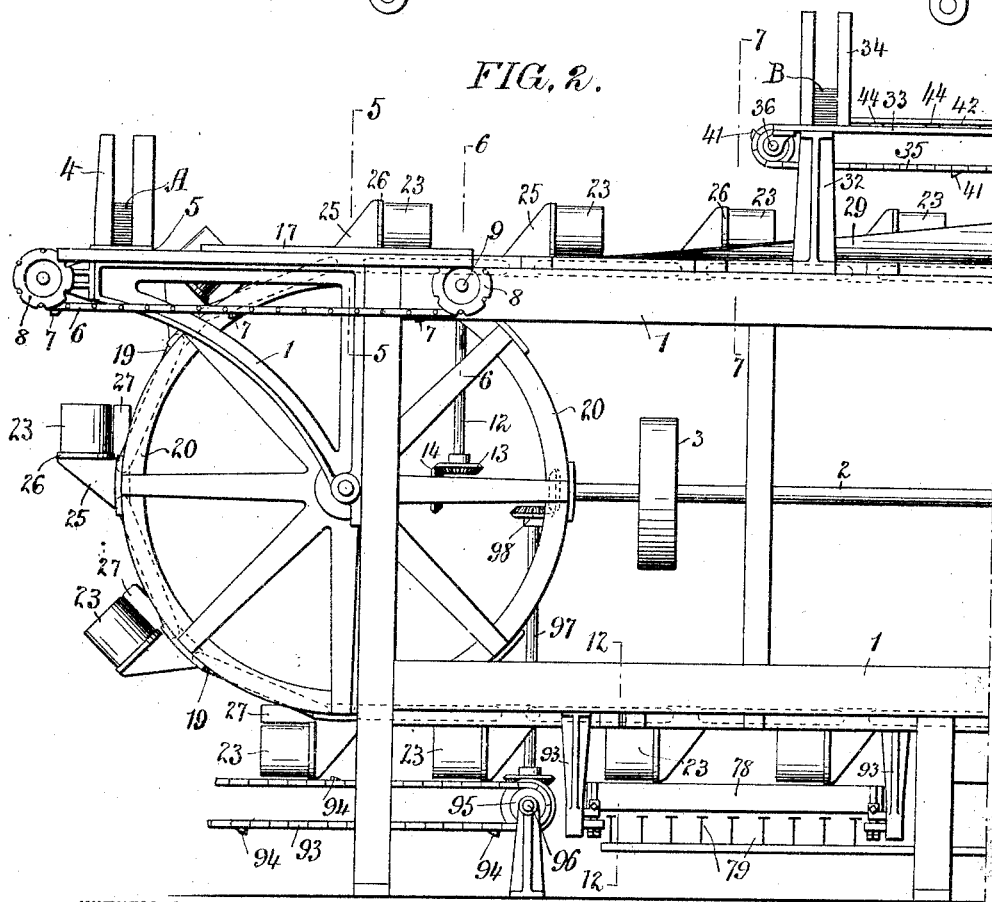

J. C. DONNELLY.
MACHINE FOR MAKING CAN BODIES.
APPLICATION FILED JULY 11, 1905.
No. 919,557.
Patented Apr. 27, 1909.
13 SHEETS—SHEET 2.
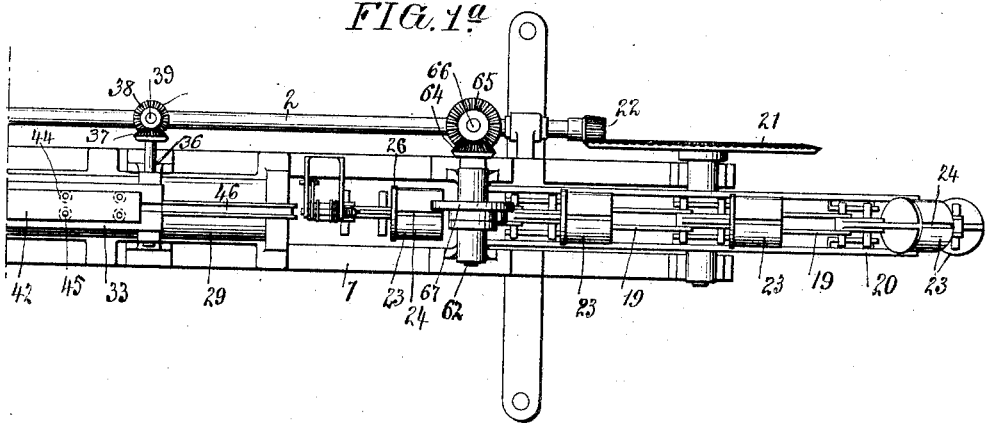
FIG. 1ª
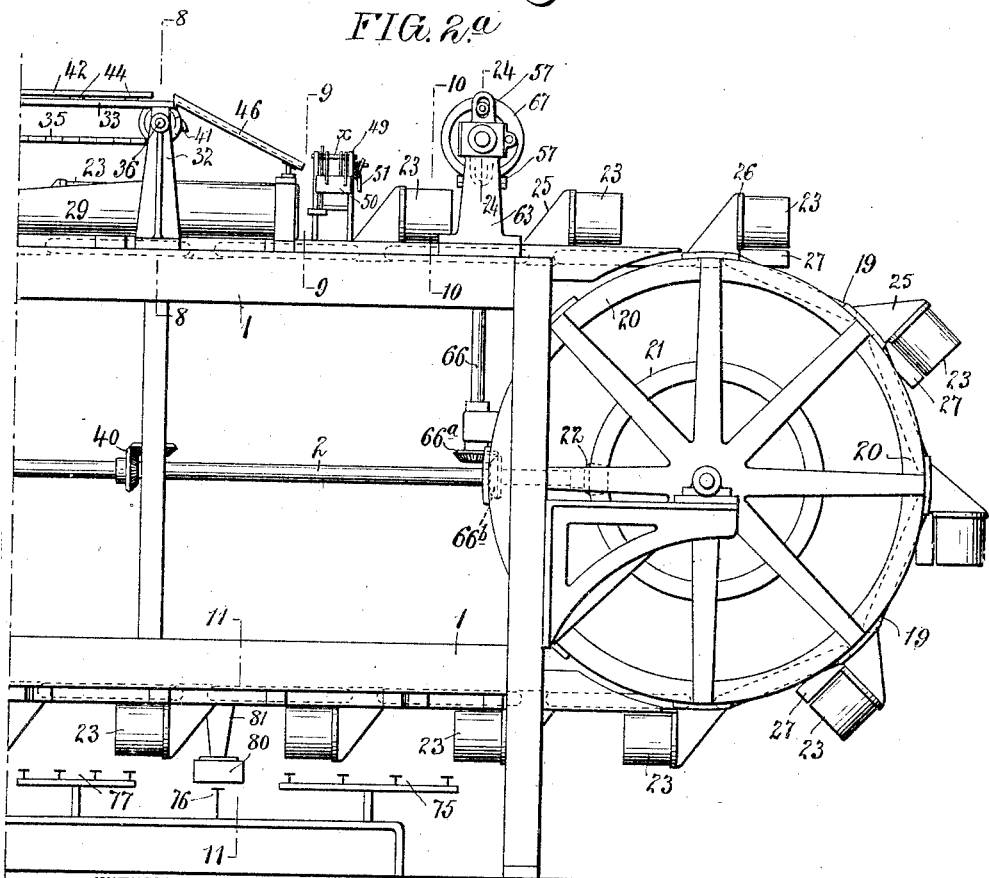
FIG. 2ª
WITNESSES:
John H. Tenney
M. G. Hayes
INVENTOR
Joseph C. Donnelly
BY
John F. Nolan
ATTORNEY.

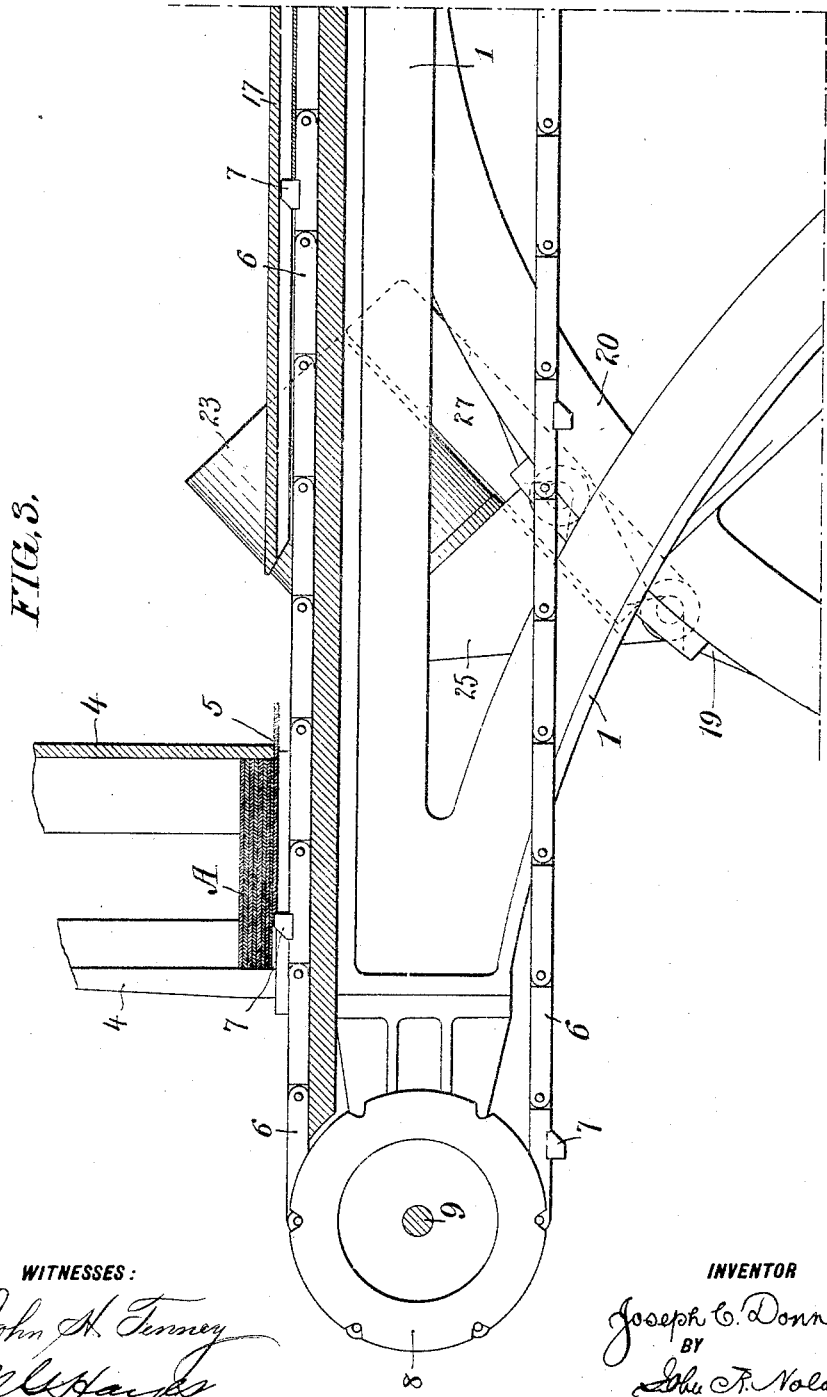

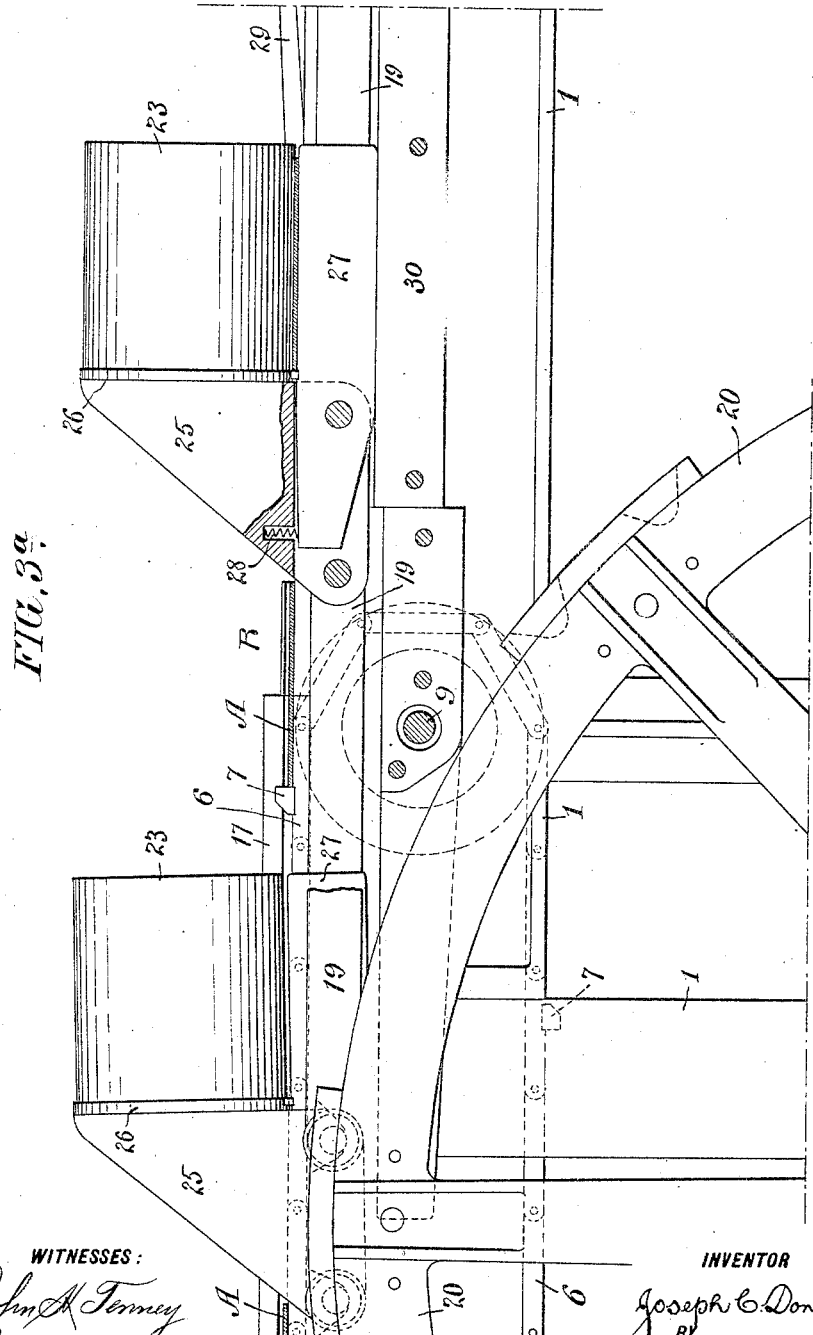

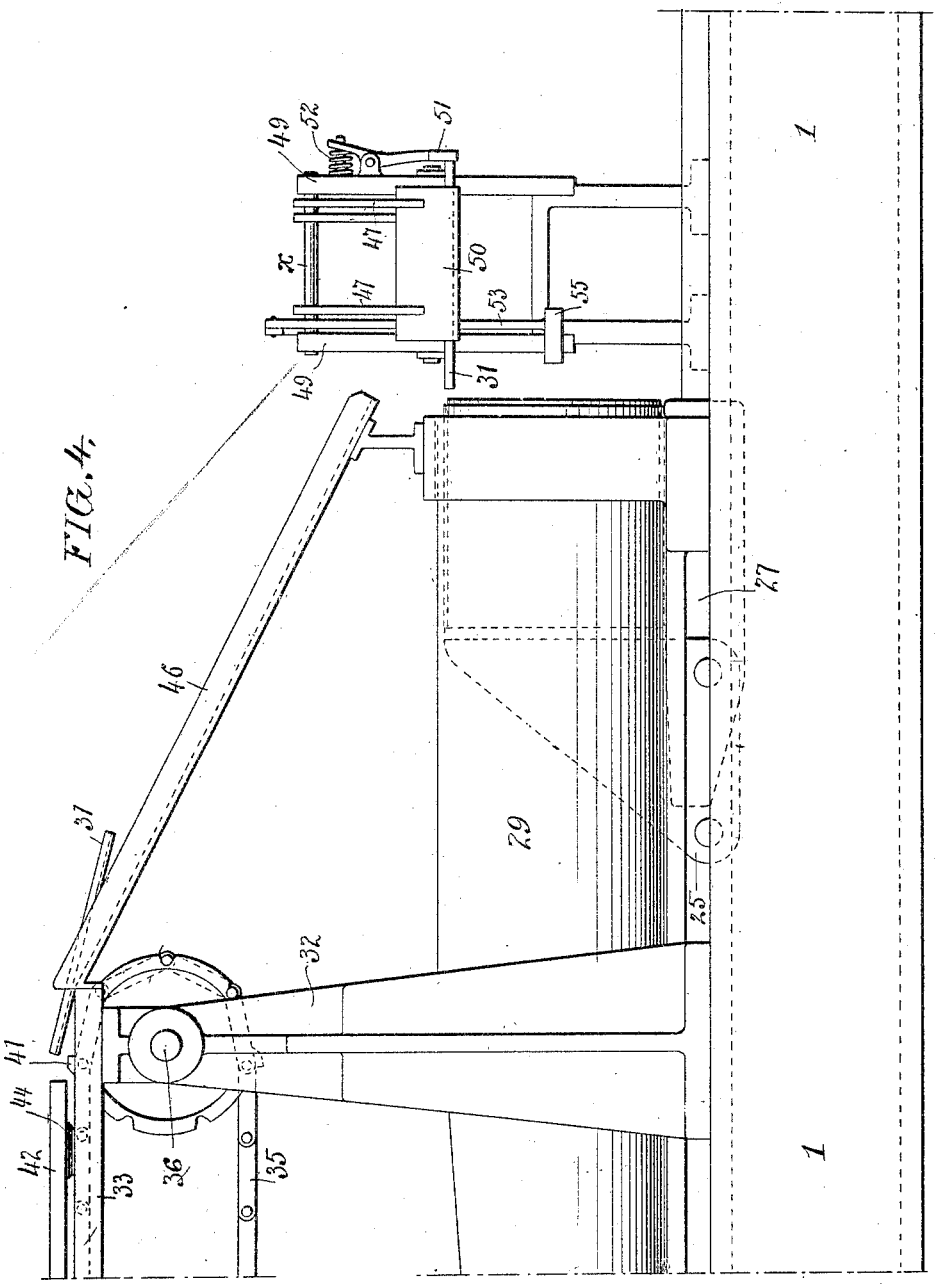

J. C. DONNELLY.
MACHINE FOR MAKING CAN BODIES.
APPLICATION FILED JULY 11, 1905.

919,557.

Patented Apr. 27, 1909.
13 SHEETS—SHEET 6.

WITNESSES:
John H. Finney
M. E. Hayes

INVENTOR
Joseph C. Donnelly
BY John R. Nolan
ATTORNEY.

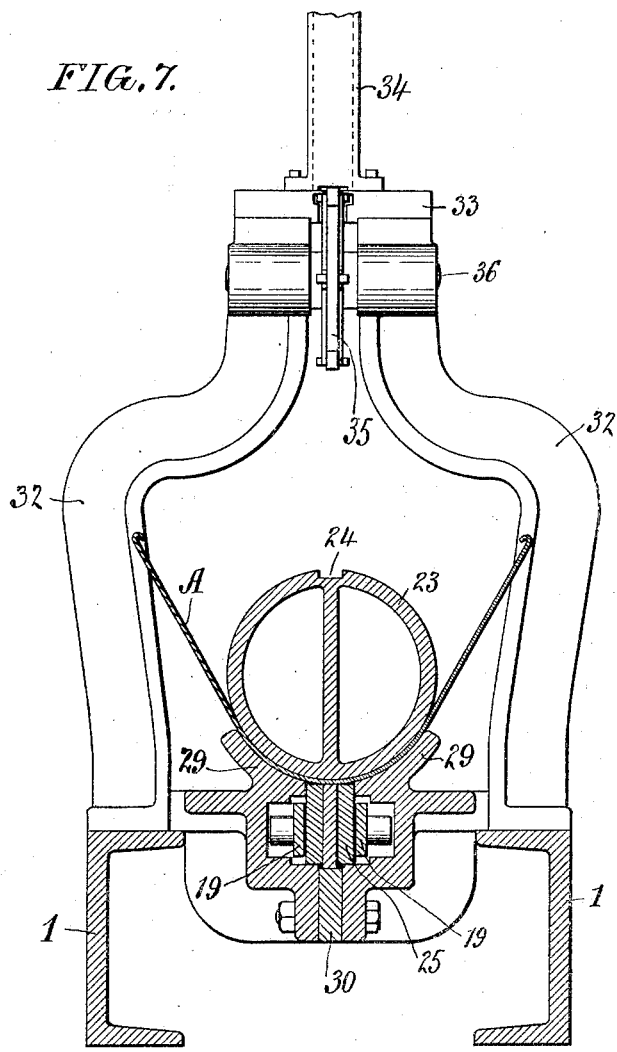

J. C. DONNELLY.
MACHINE FOR MAKING CAN BODIES.
APPLICATION FILED JULY 11, 1905.
919,557.
Patented Apr. 27, 1909
13 SHEETS—SHEET 9.
FIG. 10.
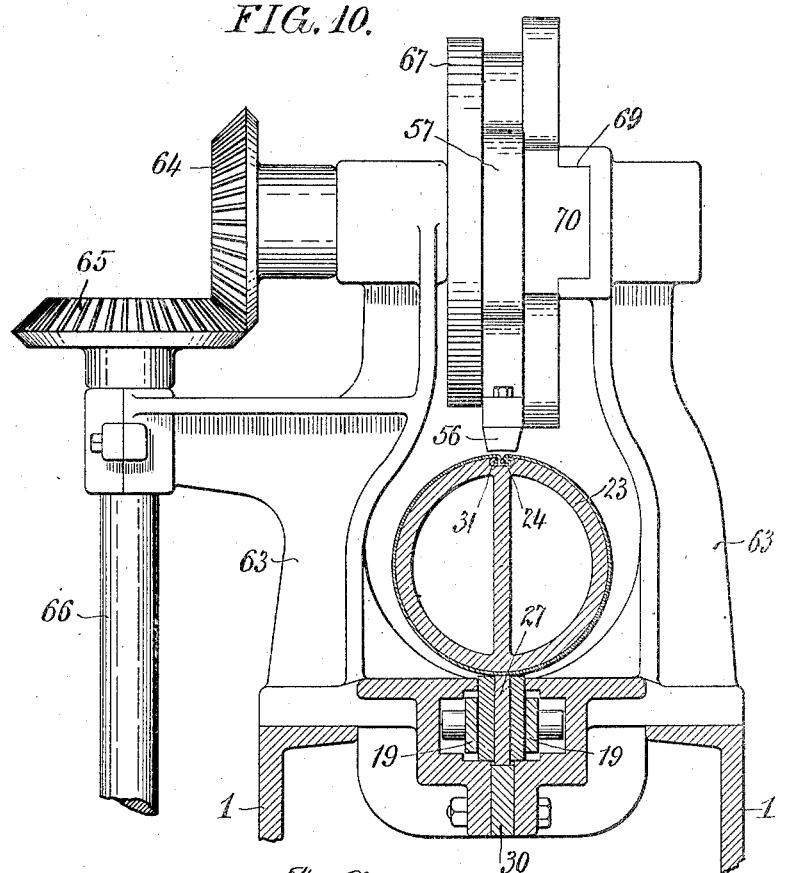
FIG. 9.
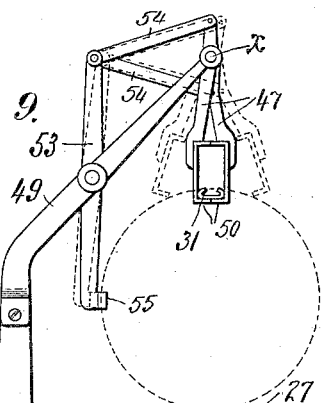
WITNESSES:
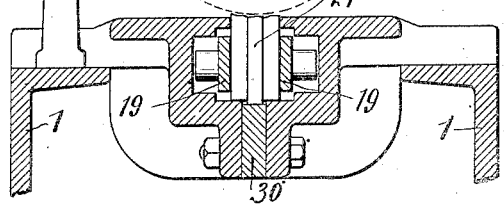
INVENTOR
Joseph C. Donnelly
BY
John R. Nolan
ATTORNEY.

J. C. DONNELLY.
MACHINE FOR MAKING CAN BODIES.
APPLICATION FILED JULY 11, 1905.

919,557.

Patented Apr. 27, 1909.
13 SHEETS—SHEET 10.

WITNESSES:
John H. Tenney
M. E. Hayes

INVENTOR
Joseph C. Donnelly
BY
John R. Nolan
ATTORNEY.

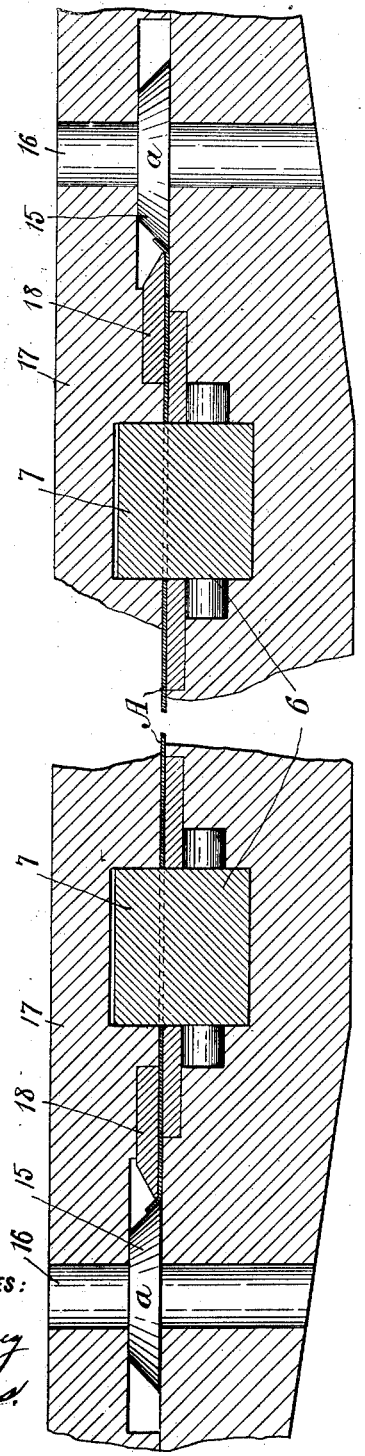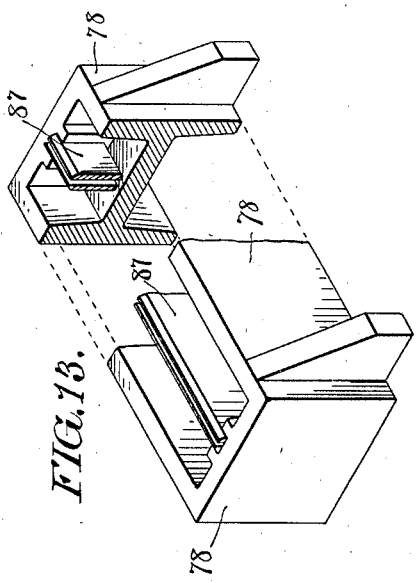

J. C. DONNELLY.
MACHINE FOR MAKING CAN BODIES.
APPLICATION FILED JULY 11, 1905.

919,557.

Patented Apr. 27, 1909.
13 SHEETS—SHEET 12.

WITNESSES:
John A. Tenney
M. E. Hayes

INVENTOR
Joseph C. Donnelly
BY
John F. Nolan
ATTORNEY.

J. C. DONNELLY.
MACHINE FOR MAKING CAN BODIES.
APPLICATION FILED JULY 11, 1905.

919,557.

Patented Apr. 27, 1909.
13 SHEETS—SHEET 13.

WITNESSES:
John M. Tenney
M. S. Hayes

INVENTOR
Joseph C. Donnelly
BY
John R. Nolan
ATTORNEY.

UNITED STATES PATENT OFFICE.

JOSEPH CHARLES DONNELLY, OF DETROIT, MICHIGAN.

MACHINE FOR MAKING CAN-BODIES.

No. 919,557.            Specification of Letters Patent.         Patented April 27, 1909.

Application filed July 11, 1905. Serial No. 269,230.

*To all whom it may concern:*

Be it known that I, JOSEPH C. DONNELLY, a citizen of the United States, and resident of Detroit, in the county of Wayne and State of Michigan, have invented certain new and useful Improvements in Machines for Making Can-Bodies, of which the following is a specification.

This invention relates to machines for forming can bodies; my object being to provide a machine whereby can bodies having a joint or seam of superior character shall be rapidly and effectively produced.

In the present embodiment of my invention, suitable blanks of sheet metal are fed to and through appropriate devices by means of which flanges are formed along the longitudinal edges of the blanks, and thence through a former by means of which the flanged blanks are forced around traveling mandrels. Flanged "joint strips" are progressively formed, and fed to, and interlocked with, the flanged edges of the blanks on the mandrels, and the interlocked parts are then subjected to the impact of a hammer device during their traverse. The cylindrical bodies thus produced are next carried to fluxing and soldering devices by means of which the joints or seams produced by the interlocked members are effectively soldered together, and the can bodies thus produced are then successively discharged from their respective mandrels.

The invention comprises various novel features of construction, combinations and organizations of parts which will be hereinafter fully set forth, and then particularly pointed out in the claims.

Figure 5:
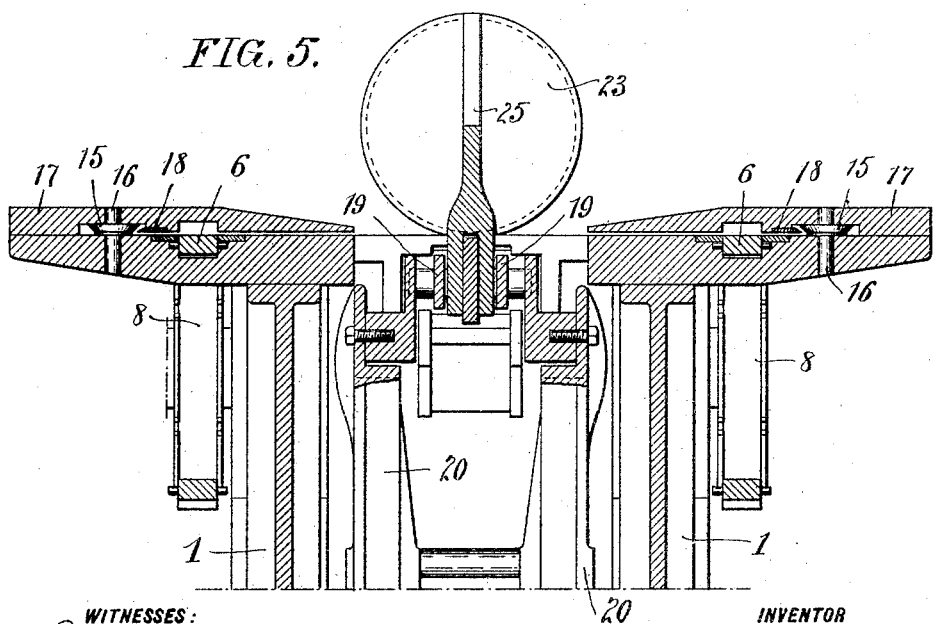
Figure 8:
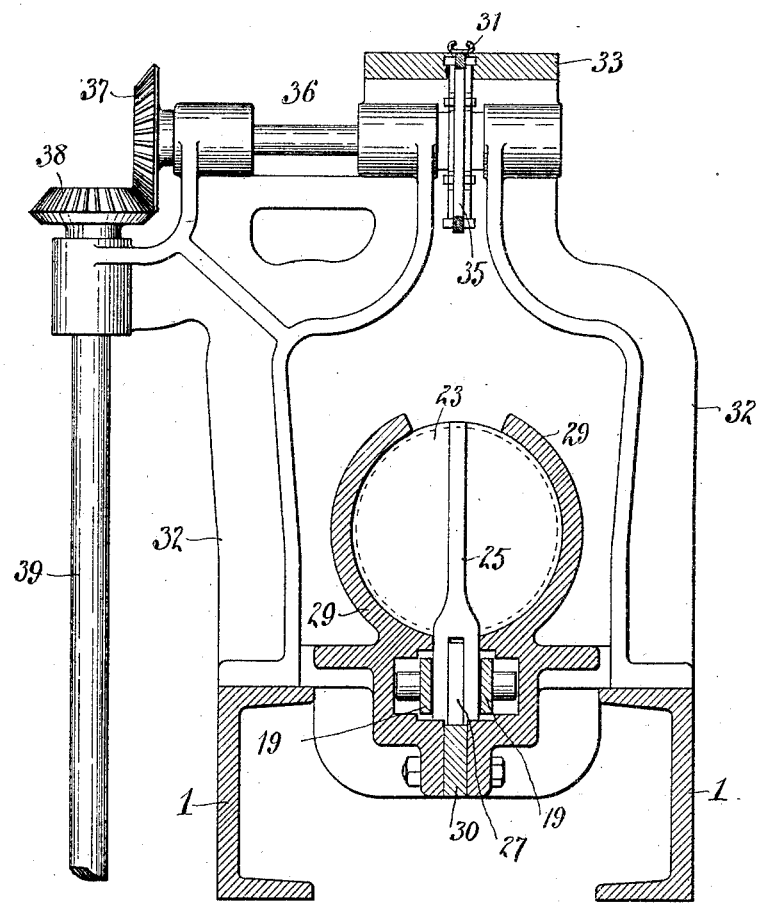
Figure 11:
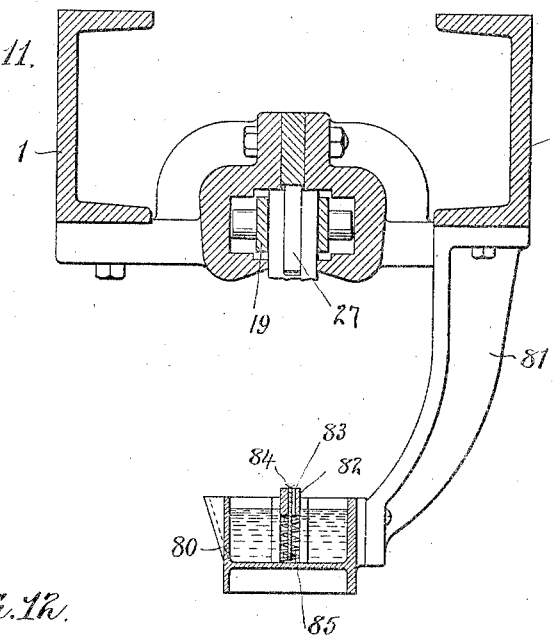
Figure 12:
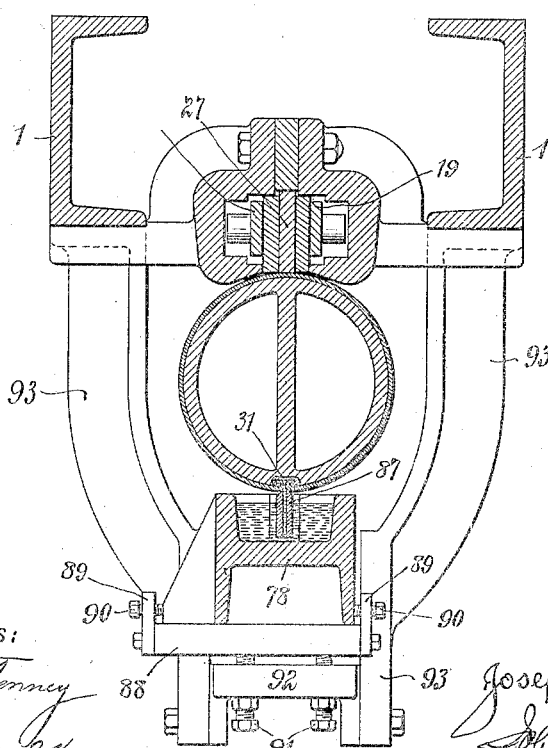
Figure 19:
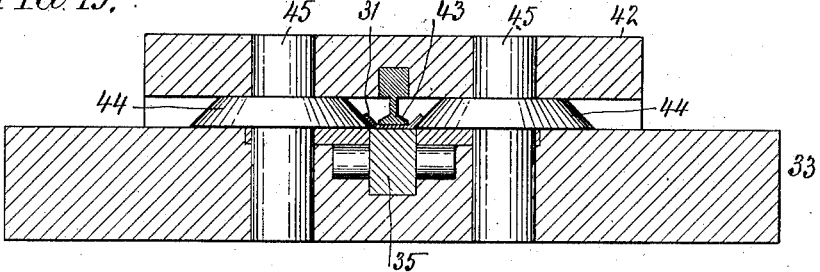
Figure 20:
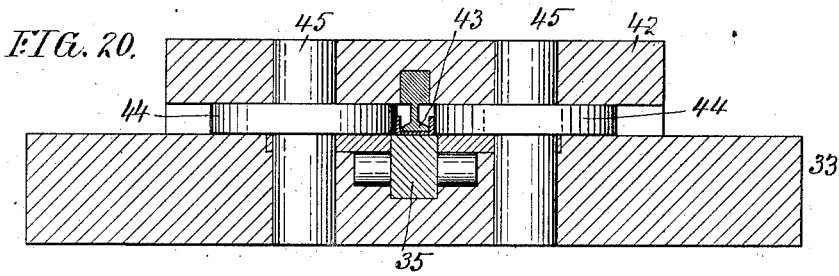
Figure 21:
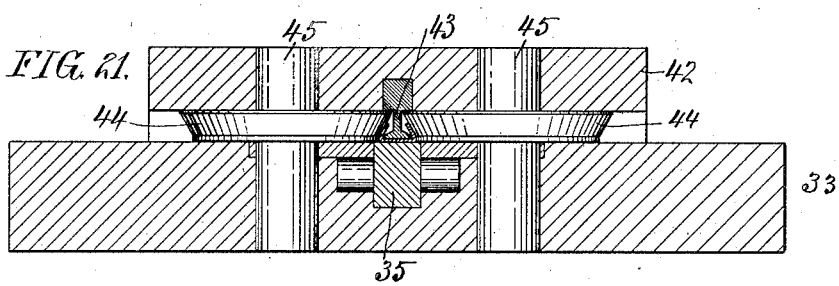
Figure 22:
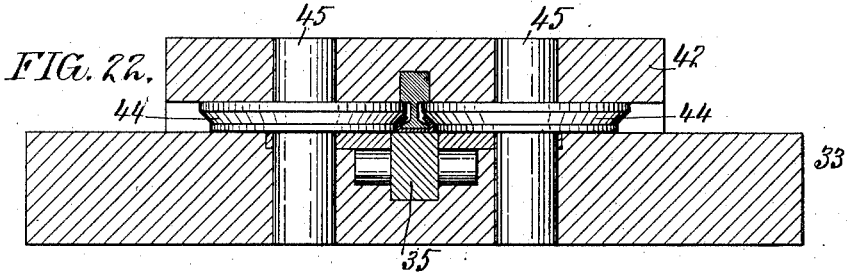
Figure 23:
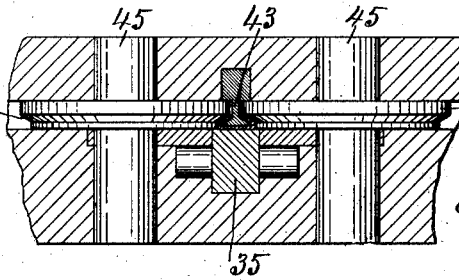
Figure 25:
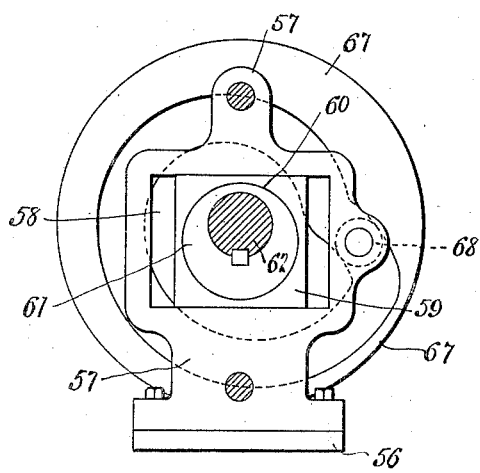
Figure 26:
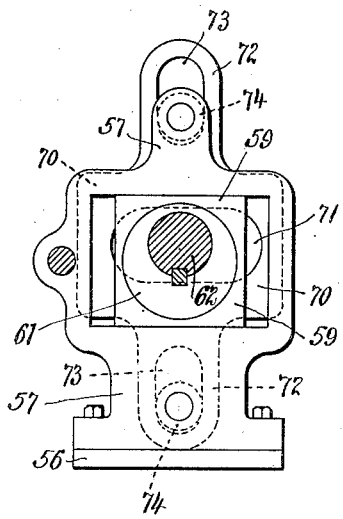
Figure 24:
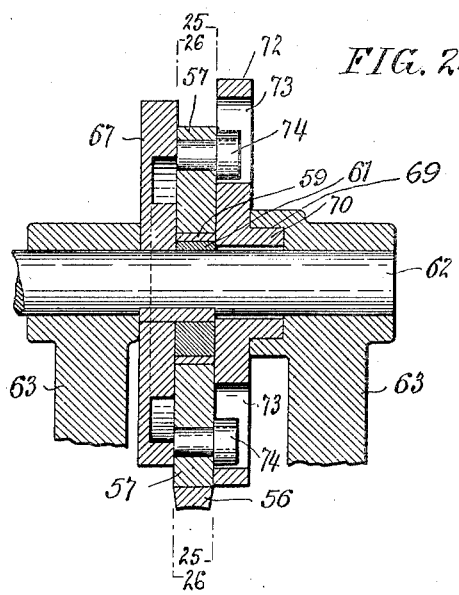

In the drawings—Figure 1 and Fig. 1ª, considered together, are a plan of an apparatus embodying my invention. Fig. 2 and Fig. 2ª are a side elevation thereof. Fig. 3 and Fig. 3ª are a vertical section, enlarged, as on the line 3—3 of Fig. 1. Fig. 4 is an elevation of the mechanism for supporting the "joint strip" in the path of the can body, showing adjacent parts of the machine. Fig. 5 is a transverse section, as on the line 5—5 of Fig. 2. Fig. 6 is a similar section, as on the line 6—6 of Fig. 2. Fig. 7 is a section as on the line 7—7 of Fig. 2. Fig. 8 is a section as on the line 8—8 of Fig. 2ª. Fig. 9 is a section as on the line 9—9 of Fig. 2ª. Fig. 10 is a section as on the line 10—10 of Fig. 2ª. Fig. 11 is a section as on the line 11—11 of Fig. 2ª. Fig. 12 is a section as on the line 12—12 of Fig. 2. Fig. 13 is a perspective view, partly in section, of the soldering device. Fig. 14 is a transverse section, enlarged, as on the line 14—14 of Fig. 1, showing the action of the first set of flanging wheels, on the edges of the blank for the can body. Figs. 15, 16, 17 and 18 are sections illustrating each of the successive flanging wheels and the progressive action thereof upon the blank. Fig. 19 is a transverse section, enlarged, as on the line 19—19 of Fig. 1, showing the action of the first set of flanging wheels on the edges of the blank for the joint-strip. Figs. 20, 21, 22 and 23 are similar sections, showing the succeeding sets of flanging wheels and their progressive action upon the blank. Fig. 24 is a transverse section, enlarged, through the hammer devices, as on the line 24—24 of Fig. 2ª. Fig. 25 is a vertical section, as on the line 25—25 of Fig. 24. Fig. 26 is a similar section, as on the line 26—26 of Fig. 24.

1 indicates the main frame of suitable shape and size to support the various parts of the apparatus; and 2 the main driving shaft extending lengthwise and to one side of the main frame, and having a drive pulley 3 to which the motion is transmitted from a suitable source of power.

At one end of the main frame is a hopper 4 for the reception of superposed blanks A of sheet metal for the can bodies. In the lower rear edge of the hopper is a space 5, through which the lowermost blanks are successively expelled. In the present instance the blanks are removed by means of a pair of endless chains 6, provided at regular intervals with lugs 7 which during the travel of the chain, take against the opposing edges of the blanks. These chains are carried by sprocket wheels 8 on suitably-disposed shafts 9. The rearward shaft 9, is provided at one end with a bevel gear wheel 10 which meshes with a similar wheel 11 on a vertical shaft 12, the latter shaft being geared with the main shaft by co-acting bevel gear wheels 13, 14, respectively. Thus the sprocket chains are positively driven.

Directly in rear of the hopper, and in the paths of the respective lateral edges of each blank as it is carried therefrom by the chains, are two rows of flanging wheels 15. The wheels of each row are carried by vertical shafts 16 which are journaled in the top of the main frame and in plates 17 imposed thereon. These plates extend inward toward the median line of the machine, a space being afforded between the plates and the frame top for the passage and guidance of the blanks. In the present instance there are five flanging wheels in each row, and they are so shaped and located as to act successively upon the advancing edge of the blank, and gradually turn a lip or flange therealong. The configurations and progressive operations of the wheels are shown in Figs. 14 to 18, inclusive, wherein it will be seen that the periphery of the first wheel (a) is beveled from the base toward the axis of the wheel to impart a slight upward bend to the opposing edge of the blank; the periphery of the second wheel (b) is parallel to its axis to turn the edge to a vertical position; the periphery of the third wheel (c) has a plane basal portion with an outwardly beveled portion, to turn the edge partially inward; and the peripheries of the remaining wheels (d and e) are inclined or beveled outwardly at decreasing angles so as to bend the upturned edge of the blank still farther inwardly. Along the under portion of the plate, adjacent each row of wheels, is set a strip of steel 18 having a beveled edge against which the opposing edge of the blank is turned by the wheels in order to insure a sharp and uniform bend.

The two rows of wheels correspond with each other in all particulars and hence the longitudinal edges of the blank are simultaneously and similarly acted upon thereby.

Extending from end to end of the machine, along the middle thereof, is a sprocket chain 19 which is supported upon large sprocket wheels 20 at the respective ends of the main frame. The shaft of one of the wheels is provided with a bevel spur wheel 21 with which meshes a bevel pinion 22, on the main shaft, thereby positively driving the chain. This chain carries at regular intervals cylindrical mandrels 23 around and against which the blanks are gradually and forcibly turned, and each of which mandrels is of a diameter equal to the internal diameter of the canbody to be produced, or practically so. In each of the mandrels, along that side thereof which is uppermost while the blank is being pressed thereon, is a longitudinal groove or channel 24 which receives the upper lipped edges of the blank when the latter has circumscribed the mandrel.

The mandrels are preferably formed on or secured to outwardly-extending lugs 25 on the inner links of the chain in such position as to lie slightly above and parallel with the other links while the chain is in horizontal position, and the basal ends of the mandrels are provided with flanges 26. These mandrels are so disposed on the chain that as they pass upward at the forward end of the machine, they successively enter the space between the plates 17 and as they move along they pass above and thus over...... the blanks which are being acted upon by the forming wheels. The flanged portion of each mandrel takes against the opposing edge of the blank and serves as an abutment therefor. Each of the inner links of the chain is longitudinally slotted or bifurcated to receive therein, beneath the lug 25, one arm of a lever 27, the other arm of which extends beneath the adjacent mandrel. Confined within a socket in the lug is a spiral spring 28 which bears upon the opposing arm of the lever and thus forces the other arm thereof yieldingly toward the mandrel. The lever thus serves as a clamp member which co-acts with the mandrel to grip the interposed blank.

Supported upon the bed in rear of the flanging wheels, is a hollow forming member 29 having internal curved walls which are parallel throughout their length to the axis of said member, the latter being, in effect, the diagonal section of a longitudinally slotted cylinder. This cylinder section gradually inclines rearwardly from the bed, its internal diameter being equal to that of the external diameter of the can-body to be formed, or practically so, and the member being preferably formed of two longitudinally divided parts which are bolted to the main frame.

When the horizontally disposed blanks, with the lips or flanges formed thereon, leave the flanging wheels, they are carried rearward into and through the forming member 29, by their respective mandrels, and hence the blanks are gradually pressed up and around the proximate mandrels by the action of the internal walls of the forming member, the flanged edges of the blank as it approaches and reaches the rear end of such member thus being turned into juxta-relation and disposed in the longitudinal groove or channel in the mandrel.

In order to insure and maintain the positive gripping of the clamp levers against the blanks, as the latter are being moved along the machine and through the forming devices, there is affixed to the main frame directly beneath the path of travel of said levers, a horizontal rail 30 upon which the said lever rides and by which the lever is held up against the can-body. (See Fig. 3ª.)

As each of the mandrels with its cylindrical blank passes from the forming member, a "joint strip" 31, is applied to the lipped edges of the blank. This feature of the invention is an important one. The means herein shown for forming and applying the strips is as follows; but it is to be understood that other means to the same end may be employed without departing from my invention.

Supported upon posts 32 rising from the table, is a horizontal bar 33 at one end of which is a hopper 34 in which are superposed the blanks B from which the joint strips are to be formed. This bar is supported directly above the median line of the machine, and it is provided with a longitudinal way for an endless sprocket chain 35 which passes directly beneath the hopper. The carrying wheels for the sprocket chain are borne by shafts 36 supported adjacent the respective ends of the plate, the rearward shaft being provided with a bevel gear 37 which meshes with a similar gear 38 on a vertical shaft 39. The lower end of the latter shaft is geared with the main shaft by the co-acting wheels 40, and hence the motion is transmitted from the main shaft to the chain. This chain is provided at regular intervals with lugs 41 which, in their travel, take against the opposing ends of the successive lowermost strips in the hopper and move them along the bar 33. Supported on the bar, so as to leave an intervening space, is another bar 42 along the under side of which extends a die rail 43. The lower side of this rail lies slightly above the plane of the bar 33 to afford a space for the passage of the strip, as the latter is impelled by the sprocket chain 35. On the respective sides of this rail are flanging wheels 44 which correspond in shape with the wheels 15 previously described, the wheels 44 being similarly arranged in two rows and being adapted to act successively upon the opposing edges of the blanks and thereby gradually to turn such edges upon the flanges of the die rail to form corresponding longitudinal lips or flanges on the blanks. The wheels 44 are carried by shafts 45 which are journaled in the bars 33, 42. (See Figs. 19 to 23, inclusive.)

At the rearward end of the bar 33 is an inclined chute 46 down which the flanged strips descend endwise. These strips fall upon a supporting device which is arranged adjacent the rearward end of the forming member, each strip being thereby supported horizontally in line with the recessed portion of the advancing mandrel, so that such portion will receive the strip and cause it to interlock with the flanged edges of the can-body.

The supporting device herein illustrated comprises two pairs of depending arms 47 loosely swung on a shaft x supported in arms 49 which overhang the path of travel of the mandrels. The lower ends of the arms 47 carry a pair of jaws 50 having horizontal flanges, which, when the jaws are closed, afford a seat for the strip. (See Figs. 4 and 9). Normally the jaws are closed by gravity, and hence as the strip is discharged from the chute the strip passes upon the underlying flanges.

Adjacent the outer or rearward end of the flanges is a depending abutment piece 51. This piece is pivoted at its upper end to the adjacent arm 49 and is held normally in down position by a suitably disposed spring 52, the force of which is sufficient to resist the end thrust of the strip as the mandrel advances.

It is to be understood that the jaws simply support the strip during the entry of the forward end of the strip into the channel of the mandrel, and that thereupon the jaws are opened to permit the complete insertion of the strip into the can-body as the strip bears against the abutment 51. The means to effect the opening of the jaws at the proper time comprises a vertical lever 53 pivoted to the adjacent arm 49, and provided at its upper end with two diverging links 54, one of which is connected with an upward extension of one of the arms 47 and the other is connected with the opposite arm at a point below the shaft x. The lower end of the lever 53 is provided with a beveled shoe 55, which, when the jaws are closed, depends in the path of the edge of the mandrel. This shoe is so arranged that when the joint strip has been introduced into the channeled end of the mandrel, the mandrel abuts against the shoe and thus forces the lever outward, the link connections with the jaw arms thereupon opening the latter, as indicated by the dotted lines in Fig. 9. The jaws are thus clear of the strip and the mandrel, and hence as the latter progresses the strip is pushed wholly into the channel. The end of the mandrel then impinging against the pivoted abutment, swings the latter upward against the stress of the spring, and the abutment rides upon the can-body until the mandrel has cleared the abutment, whereupon th abutment resumes its previous position in readiness for a succeeding operation. At the same time, the shoe 55 clears the mandrel and the jaws also resume their normal position.

As each mandrel travels rearward with the cylindrical can-body and its joint strip, a hammer acts upon the "seam" in a manner to clench the interlocking flanges of the can-body and strip, and thus effect a firm and stable bond between the edges of the can-body.

The hammer and its actuating devices are of such a construction that it imparts a uniform impact upon the body and strip during the continuous and uninterrupted travel of the mandrel. To this end, the hammer in its preferred form comprises a bar 56 corresponding in length with the can-body, and secured to a slotted head 57. Slidingly fitted in the slot 58 of the head is a block 59 provided with a circular orifice 60 in which is mounted an eccentric 61, keyed to a transverse shaft 62. This shaft has its bearings in uprights 63 rising from the main frame, and carries at one end a bevel gear wheel 64 which meshes with a corresponding wheel 65 on a vertical shaft 66. The latter shaft is driven from the main shaft 2 by co-acting gear wheels 66ª, 66ᵇ, respectively. Keyed on the shaft 62 adjacent one side of the head is a face cam 67, the cam groove of which receives a roller 68 carried by the head, and is of such form as to reciprocate the head horizontally, that is, in the direction of movement of the mandrel and back again. Slidingly fitted to a horizontal guide way 69 in one of the uprights 63 is a head 70 which is provided with a horizontal slot 71 for the free passage of the shaft 62. Extending from the top and bottom of the head 70 are two arms 72 respectively provided with vertical guide slots 73 which receive lateral rollers 74 on the head 57. It will be seen that during the rotation of the shaft 62 the eccentric 61 imparts a vertically reciprocating action to the block 59 and perforce to the head 57, the hammer on the latter thereupon striking the underlying can-body. This head is guided vertically by its roller connections with the vertical slots 73 in the arms of the head 70, which latter head, being horizontally movable, is reciprocated transversely by the cam head 57 during the operation of the latter by the cam 67 as above stated.

The resultant of the concurrent horizontal and vertical movements imparted to the hammer by the mechanism just described, is an orbital movement which causes the hammer to act upon and move along for a short distance with the traveling can-body.

As the can-bodies are successively acted upon by the hammer they are carried by the mandrels downwardly around the rearward wheel 20, and thence forwardly in a horizontal plane; the seams of the can-bodies thus being on the underside of the forwardly traveling mandrels. Mounted below the path of the latter are novel fluxing and soldering devices for the seams, which devices comprise a row of gas burners 75 which first heat each of the seams as the can body advances; an oil device which then applies oil, or any suitable fluxing liquid, to the seam, (a burner 76 being disposed below the oil device to heat the contents thereof) a row of gas burners 77 which next heat the seam: and a solder containing vessel 78 in which the solder is maintained in liquid form by a row of gas burners 79 and from which vessel the solder is uniformly applied between the adjoining edges of the can-body.

The oil device in its preferred form comprises a rectangular oil containing tank 80 supported by a bracket arm 81 depending from the main frame. Slidingly fitted to guides in the internal end walls of the tank is a bar 82 having a longitudinal slot 83 for the passage of a wick 84 which projects above the said bar into the path of the seams on the can-bodies and which wick also extends down into the oil contents of the tank. The bar is held normally and yieldingly in the raised position by a suitably disposed spring or springs 85. By this construction it will be seen that the oil will be taken up by the wick by capillary attraction, and that as the seams pass along in contact with the upper edge of the wick, the latter will uniformly apply the oil thereto.

The soldering device preferably comprises a long vessel 78 supported below the return path of travel of the can-bodies. Extending within the vessel from end to end thereof is a bar 87 provided with a thin longitudinal slot. This bar may be a single integral member, or it may be conveniently composed of two slightly separated strips. The upper portion of this bar is tapered to enter into the space between the joined edges of the can body, and hence the liquid solder, as the can body travels along, passes by way of the slot, by capillary attraction, into such seam in a manner to effect a uniform application of the solder thereto.

Provision is had for the minute vertical and horizontal adjustment of the vessel to insure the accurate disposition of the soldering bar in respect to the seams of the can-bodies. To this end the vessel is conveniently supported at its ends upon underlying cross bars 88 provided with upwardly projecting lugs 89 in which are fitted set screws 90 that take against the side members of the vessel. These bars in turn are carried by and upon vertical set screws 91 extending through lower transverse bars 92 affixed to depending brackets 93 on the main frame. By manipulating the screws 91 minute vertical adjustment of the bars and the soldering vessel thereon may be secured, and by manipulating the set screws 90 the solder vessel may be adjusted transversely on the bars.

When the can-bodies leave the soldering device, they pass over an off-bearing sprocket chain 93, which is provided at regular intervals throughout its length with spurs 94 which, entering the longitudinal grooves or channels of the mandrels at points rearward of the seams, take against the opposing can-bodies and strip them successively from their respective mandrels. The chain 93 passes around a sprocket wheel 95 on a transverse shaft 96 which is driven from the main shaft by the vertical shaft 97 and bevel gearing 98.

I claim—

1. The combination with a mandrel and means for forcing about the same a blank sheet having flanged edges, so that such edges shall be brought into juxta-relation, of means for supporting a joint strip endwise and longitudinally of the said flanged edges, and means for effecting relative longitudinal movement between said mandrel and strip support, whereby the strip is interlocked with said edges longitudinally thereof.

2. The combination with a mandrel, means for forcing about the same a blank sheet having flanged edges so that such edges shall be brought into juxta-relation, and means for impelling the mandrel, of means for supporting a joint strip endwise of the said flanged edges and in the path of travel thereof, so as to be received endwise by, and be longitudinally interlocked with, said edges.

3. The combination with means for flanging the edges of a blank sheet, of means for bodily turning said sheet to bring its said edges in juxta-relation, means for impelling said sheet, and means for supporting a joint member in and longitudinally of the path of travel of the flanged edges of said sheet so as to be received endwise by, and be thereby interlocked with, said flanged edges.

4. The combination with means for flanging the edges of a blank sheet, of means for bodily turning said sheet to bring its said edges in juxta-relation, means for impelling said sheet, means for supporting a joint member in and longitudinally of the path of travel of the flanged edges of said sheet so as to be received endwise by, and be interlocked with, said flanged edges, and means for flattening the interlocked portions.

5. The combination with means for flanging the edges of a blank sheet, of means for bodily turning said sheet to bring its said edges in juxta-relation, means for impelling said sheet, means for supporting a joint member in and longitudinally of the path of travel of the flanged edges of said sheet so as to be received endwise by, and be interlocked with, said flanged edges, means for flattening the interlocked portions, and means for applying solder to such portions.

6. The combination with means for flanging the edges of a blank sheet, of a mandrel, means for forcing said sheet upon the mandrel to bring the said edges adjacent to each other, means for impelling said mandrel, and means for supporting a joint member in and longitudinally of the path of travel of the flanged edges of the sheet so as to be received endwise by, and be interlocked with, said flanged edges.

7. The combination with means for flanging the edges of a blank sheet, of a mandrel, means for forcing said sheet upon the mandrel to bring the said edges adjacent to each other, means for impelling said mandrel, means for supporting a joint member in and longitudinally of the path of travel of the flanged edges of the sheet so as to be received endwise by, and be interlocked with, said flanged edges, and means for flattening the interlocked portions upon the mandrel.

8. The combination with means for flattening the edges of a blank sheet, of a mandrel, means for forcing said sheet upon the mandrel to bring the said edges adjacent to each other, means for impelling said mandrel, means for supporting a joint member in and longitudinally of the path of travel of the flanged edges of the sheet so as to be received endwise by, and be interlocked with, said flanged edges, means for flattening the interlocked portions upon the mandrel, and means for applying solder to such portions.

9. The combination with a source of blank supply, flanging devices, and means for feeding the blanks to said devices, of a series of traveling mandrels to receive and carry the blanks, a former to press the blanks about the mandrels, a source of strip supply, flanging devices therefor, means for feeding the said strips to said flanging devices, and means for presenting said strips endwise to and interlocking them with the flanged edges of the blanks on the mandrels.

10. The combination with a source of blank supply, flanging devices, and means for feeding the blanks to said devices, of a series of traveling mandrels to receive and carry the blanks, a former to press the blanks about the mandrels, a source of strip supply, flanging devices therefor, means for feeding the said strips to said flanging devices, means for presenting said strips endwise to and interlocking them with the flanged edges of the blanks on the mandrels, and means for flattening the interlocked portions on the mandrel.

11. The combination with a source of blank supply, flanging devices, and means for feeding the blanks to said devices, of a series of traveling mandrels to receive and carry the blanks, a former to press the blanks about the mandrels, a source of strip supply, flanging devices therefor, means for feeding the said strips to said flanging devices, means for presenting said strips to and interlocking them with the flanged edges of the blanks on the mandrels, means for flattening the interlocked portions on the mandrels, and means for soldering such interlocked portions.

12. The combination with flanging wheels having gradually varying peripheries, of means for progressively feeding blank sheets to said wheels, whereby the edges of each sheet are longitudinally flanged, means for bodily turning said sheet to bring its flanged edges in juxta-relation, means for impelling said sheet with its flanged edges, and means for supporting a joint member in and longitudinally of the path of travel of the flanged edges of the sheet so as to be received endwise by and be interlocked with said flanged edges.

13. The combination with two corresponding rows of flanging wheels having gradually varying peripheries, of means for progressively feeding blank sheets to and between the two rows of wheels whereby the longitudinal edges of each sheet are gradually flanged, means for bodily turning said sheet to bring its flanged edges in juxta-relation, means for impelling said sheet with its flanged edges, and means for supporting a joint member in and longitudinally of the path of travel of the flanged edges of the sheet so as to be received endwise by and be interlocked with said flanged edges.

14. The combination with an endless carrier provided with mandrels at intervals, of means for progressively feeding blank sheets having flanged longitudinal edges in the path of said mandrels, means for forcing said sheets about the respective mandrels during their traverse, and means for supporting a joint member in and longitudinally of the path of travel of the flanged edges of the sheet so as to be received endwise by and be interlocked with, said flanged edges.

15. The combination with a mandrel having a longitudinal groove or channel therein, of means for forcing around said mandrel a blank sheet having flanged edges so that such edges shall enter the groove or channel of the mandrel, means for impelling said mandrel with the flanged sheet thereon, and means for supporting a joint member in and longitudinally of the path of travel of the flanged edges of the sheet, so as to be received endwise by, and be interlocked with, said flanged edges.

16. The combination with a mandrel having a longitudinal groove or channel therein, of means for forcing around said mandrel a blank sheet having flanged edges so that such edges shall enter the groove or channel of the mandrel, means for impelling the said mandrel with the flanged sheet thereon, means for supporting a joint member in and longitudinally of the path of travel of the flanged edges of the sheet so as to be received endwise by, and be interlocked with, said flanged edges, and means for flattening the interlocked edges.

17. The combination with a mandrel having a longitudinal groove or channel therein, of means for forcing around said mandrel a blank sheet having flanged edges so that such edges shall enter the groove or channel of the mandrel, means for impelling said mandrel with the flanged sheet thereon, means for supporting a joint member in and longitudinally of the path of travel of the flanged edges of the sheet so as to be received endwise by, and be interlocked with, said flanged edges, means for flattening the interlocked edges, and means for applying solder to such edges.

18. The combination with a mandrel having a longitudinal groove or channel in its periphery, of a longitudinal clamping member arranged on said mandrel diametrically opposite to said groove or channel and adapted to engage the body of a blank having flanged edges, means for forcing the blank about the mandrel to cause said edges to enter the said groove or channel, means for impelling the mandrel with the flanged sheet thereon, means for supporting a joint member in and longitudinally of the path of travel of the flanged edges of the sheet so as to be received endwise by, and be interlocked with, said flanged edges.

19. The combination with a carrier provided with mandrels at intervals by means of which blanks with flanged longitudinal edges are supported and impelled, of means for forcing said blanks about the respective mandrels during their traverse so as to bring such edges in juxta-relation, a source of strip supply, means for flanging the longitudinal edges of the strips, and means for supporting the flanged strips in the path of the flanged edges of the blanks on the mandrels.

20. The combination with a traveling mandrel upon which is carried a blank having flanged edges in juxta-relation, of means for supporting a joint-strip in the path of said edges for interlocking engagement therewith, said means including a movable supporting jaw, and means for shifting such jaw from the path of the blank when the strip has engaged the latter.

21. The combination with a traveling mandrel upon which is carried a blank having flanged edges in juxta-relation, of means for supporting a joint-strip in the path of said edges for interlocking engagement therewith, said means including a movable supporting jaw, and means for shifting said jaw from the path of the blank when the strip has engaged the latter, together with a yielding abutment for the outer end of said strip.

22. The combination with a series of continuously traveling mandrels, a forming member by means of which blanks are bodily bent about the mandrel to bring their edges in juxta-position, and means for applying joint strips to such edges to form can bodies, of a hammer to strike the joints or seams of said bodies, means for reciprocating said hammer toward and from said joints or seams, and means for moving said hammer in the direction of motion of the mandrels and back again.

23. The combination with a series of continuously traveling mandrels upon which blanks having flanged longitudinal edges are supported, means for pressing the said blanks around the mandrels, means for interlocking joint-strips with the flanged edges of said blanks, a hammer to strike the interlocking portions, means to reciprocate said hammer toward and from said portions, and means for moving said hammer in the direction of motion of the mandrels and back again.

24. The combination with means for carrying bodies to be soldered, of an oil containing tank supported below the path of said bodies, a longitudinally-slotted bar in said tank carrying a wick which projects into the path of said body, and means to maintain said bar yieldingly raised.

25. In combination, in a can making apparatus, means for feeding the can blanks with their edges projecting, means for bending the projecting edges while the blanks are in motion, a series of traveling mandrels to which the blanks are successively delivered by the feeding means, and carrier means for said mandrels moving to keep pace with the feeding means.

Signed at Detroit in the county of Wayne and State of Michigan this 3rd day of July A. D. 1905.

JOSEPH CHARLES DONNELLY.

Witnesses:
S. H. CORDESMAN,
L. A. CLINTON.